Patented May 25, 1943

2,319,953

UNITED STATES PATENT OFFICE 2,319,953

HEAT STABILIZER FOR POLYMERS OF VINYL CHLORIDE

Winfield Scott, Akron, Ohio, assignor to Wingfoot Corporation, Wilmington, Del., a corporation of Delaware No Drawing. Application April 1, 1941,
Serial No. 386,316

7 Claims. (Cl. 260—36)

This invention relates to a method of improving the stability of polymeric masses and articles made therefrom against the effect of heat.

Polymers of various types, while substantially clear when freshly made, often undergo discoloration and deterioration from heat, such as that employed in molding and processing these polymeric masses to form useful articles. Various substances have been added to the polymers to retard or prevent such discoloration and darkening but not always with fully satisfactory effects.

It has now been found that masses resulting from the polymerization of monomers which include or comprise vinyl chloride may be heat-stabilized by the addition to the mass after polymerization of a small amount of a metal imide or amide. This is especially true of the phthalimides and the sulfonamides of the alkali metals, alkaline earth metals and lead, the term "phthalimide" being employed to cover not only the nuclear-unsubstituted compound but also those in which the nucleus carries substituents, such as alkyl, chlorine, bromine, etc. and the term "sulfonamide" being employed to cover this class, including benzene, toluene and naphthalene sulfonamides and the like. Preferably, there is employed one of the following: sodium phthalimide, potassium phthalimide, lithium phthalimide, barium phthalimide, magnesium phthalimide, lead phthalimide, sodium sulfonamide, sodium p-toluene sulfonamide, barium p-toluene sulfonamide, barium naphthalene sulfonamide, magnesium p-toluene sulfonamide, magnesium sulfonamide, lead sulfonamide, lead p-toluene sulfonamide and lead naphthalene sulfonamide. Barium phthalimide and barium p-toluene sulfonamide are particularly effective. The compounds of any of the foregoing metals and benzene sulfonamide, naphthyl sulfonamide and nuclear substituted chloro or bromo phthalimide may also be used.

In order to test the stabilizing effect of the foregoing compounds, they were incorporated in a formula consisting of 100 parts of a copolymer of 85% vinyl chloride and 15% vinylidene chloride, 40 parts of tricresyl phosphate, and 3 parts of one of the foregoing heat stabilizers. The copolymer, the plasticizer and the stabilizer were intimately mixed and then placed on a hot rubber mill. After mixing until uniform, the product was sheeted off the mill.

Test sheets were then made by heating samples of the formula in a mold to produce a block 4" square and $\frac{3}{32}$" in thickness. The effectiveness of the heat stabilizer was observed by noting the amount of discoloration produced or by comparison with a control containing no thermal stabilizer. The samples were heated at a temperature of 305° F. for a period of 30 minutes, the control under these conditions becoming black and opaque. On the other hand, the samples containing approximately 3% of stabilizer on the copolymer retained their transparency and darkened very little.

While the invention has been described particularly with reference to vinyl chloride-vinylidene chloride copolymers, it may also be used with other copolymers containing vinyl chloride. Thus, copolymers of vinyl chloride and one of the following: butadiene, acrylonitrile, methacrylonitrile, styrene, vinyl bromide, isoprene, vinyl esters of carboxylic acids, such as vinyl acetate, esters of acrylic and substituted acrylic acids, such as methyl and ethyl acrylates and methacrylates, may also be heat stabilized by the incorporation of one of the substances herein set forth or other substances of the same class, i. e., amides and imides, particularly phthalimides and sulfonamides, of the alkali metal and alkaline earth metal groups and lead.

While there have been described above the preferred embodiments of the invention, it will be apparent to those skilled in the art that various modifications and changes may be made therein without departing from the spirit of the invention or from the scope of the appended claims.

The use of the sulfonamides is covered in my divisional application Serial No. 436,319, filed March 26, 1942.

I claim:

1. A method of heat-stabilizing polymerized masses containing a polymer of vinyl chloride which comprises adding to the polymer one of the group consisting of the alkali metal, the alkaline earth metal and the lead phthalimides.

2. A method of heat-stabilizing masses resulting from the polymerization of monomers comprising vinyl chloride which is characterized by adding to the polymer one of the group consisting of the alkali metal, the alkaline earth metal and the lead phthalimides.

3. A method of heat-stabilizing copolymers of vinyl chloride and vinylidene chloride which comprises adding to the copolymer one of the group consisting of the alkali metal, the alkaline earth metal and the lead phthalimides.

4. A method of heat-stabilizing masses resulting from the polymerization of monomers comprising vinyl chloride which is characterized by adding to the polymer an alkaline earth phthalimide.

5. A method of heat-stabilizing masses resulting from the polymerization of monomers comprising vinyl chloride which is characterized by adding to the polymer a lead phthalimide.

6. A method of heat-stabilizing masses resulting from the polymerization of monomers comprising vinyl chloride which is characterized by adding to the polymer barium phthalimide.

7. A method of heat-stabilizing masses resulting from the polymerization of monomers comprising vinyl chloride which is characterized by adding to the polymer lead phthalimide.

WINFIELD SCOTT.